US007328843B2

(12) United States Patent
Ko et al.

(10) Patent No.: US 7,328,843 B2
(45) Date of Patent: Feb. 12, 2008

(54) CARD READING DEVICE

(75) Inventors: Sheng-Ching Ko, Chung Ho (TW); Yen-Hung Chen, Hsintien (TW)

(73) Assignee: Jess-Link Products Co., Ltd., Taipei County (TW)

( * ) Notice: Subject to any disclaimer, the term of this patent is extended or adjusted under 35 U.S.C. 154(b) by 438 days.

(21) Appl. No.: 10/962,505

(22) Filed: Oct. 13, 2004

(65) Prior Publication Data

US 2006/0076410 A1 Apr. 13, 2006

(51) Int. Cl.
*G06K 7/06* (2006.01)

(52) U.S. Cl. ...................... 235/441; 235/486; 235/475; 235/483; 439/159; 439/326; 439/630

(58) Field of Classification Search ................ 235/441, 235/486, 475, 483; 439/159, 326, 630
See application file for complete search history.

(56) References Cited

U.S. PATENT DOCUMENTS 5,805,570 A * 9/1998 Fields et al. ................ 370/241
6,402,036 B1 * 6/2002 Bleier ........................ 235/486
6,527,189 B2 * 3/2003 Fan ............................ 235/486
6,869,302 B2 * 3/2005 Bricaud et al. ............. 439/326
6,881,086 B2 * 4/2005 Ohashi ....................... 439/326
6,890,203 B2 * 5/2005 Matsunaga et al. .......... 439/331
6,974,343 B2 * 12/2005 Zheng et al. ............... 439/326
2003/0141365 A1 * 7/2003 Sowa et al. ................. 235/441

* cited by examiner

*Primary Examiner*—Michael G. Lee
*Assistant Examiner*—Allyson N Trail
(74) *Attorney, Agent, or Firm*—Rosenberg, Klein & Lee

(57) ABSTRACT

A card reading device includes an insulating housing, at least a set of conductive terminals, a rear wall, and a shielding member. The rear wall includes a metal plate and a plastic plate that is formed by insert molding, which has a stable configuration and is unlikely to shake or distortion. The rear wall reliably presses and contacts with a top edge of a soldering portion of the conductive terminals, which is easier to be soldered so as to avoid soldering skipping or solder voiding. Moreover, the shielding member presses a top edge of the rear wall so as to make the rear wall securely press the soldering portion. Furthermore, the rear wall includes a plurality of openings therein, which make the gas circulate so as to avoid solder voiding. Thereby the qualified ration is improved.

13 Claims, 3 Drawing Sheets

CARD READING DEVICE

BACKGROUND OF THE INVENTION

1. Field of the Invention

The present invention relates to a card reading device, and particularly to a card reading device mounted on a Print Circuit Board (PCB) for retaining an electrical card so as to transmit data between the PCB and the electrical card introduced therein.

2. Description of Related Art

Recently, electrical cards have become widely used in the field of electronic appliances. As such, electrical card connectors are now adapted to connect electrical cards to appliances in which the electrical card connectors are mounted on a PCB of the appliance and retained electrical cards therein, so that data can be transferred there between.

There currently exist many different kinds of electrical cards which have different sizes. Thereby, many kinds of corresponding card reading devices have been created, such as a multi-in-one type card-reading devices, in which many different kinds of electrical cards can be used. In these card reading devices, a plurality of corresponding sets of terminals are needed to electrically connect with the different electrical cards.

Each of the terminals in the sets of the terminals has a soldering portion extending to a rear end of an insulating housing. A plastic rear wall presses and contacts a top edge of the soldering portion to ensure the soldering portion has a good level up degree and is prone to soldered.

However, the above-mentioned card-reading device has a rear wall shaped as a planar plate that is made of plastic. Thereby after assembly, the rear wall is likely to shake or distort. It is difficult to ensure that the rear wall will press against the top edge of the soldering portion, then the function of the rear wall that pressing the soldering portion is invalid. It is easy to yield soldering skipping or solder voiding while assembled.

Furthermore, the rear wall shaped as a planar plate, which disposed at the rear end of the insulating housing so as to make the card-reading device close at the rear end. Thereby, during the press that solders the soldering portion to the PCB in a solder pot, gas is not circulating. Then it is likely to produce solder voiding so as to reduce the qualified ration, and impact the electric property.

It is desirable to make an improved electrical card connector for containing electrical cards that overcomes the above problems.

SUMMARY OF THE INVENTION

An objective of the present invention is to provide a card reading device, which ensures a rear wall that reliably presses against and contacts with a top edge of soldering portions to make the soldering portions has a good level up degree and avoids soldering skipping or solder voiding.

Another objective of the present invention is to provide a card-reading device, of which having an opening style, hence the gas therein can circulate during the soldering process, which ensures the conductive terminals are reliably solder onto the PCB, thus giving the card-reading device an excellent electrical property.

In order to achieve the objects set forth, a card reading device in accordance with the present invention includes an insulating housing having a receiving cavity; at least a set of conductive terminals having a plurality of conductive terminals mounted on the insulating housing, each of the conductive terminals has a soldering portion extending out of the insulating housing, and a contact portion extending into the receiving cavity; and a rear wall having a metal plate and a plastic plate integrating with the metal plate, the rear wall connects with the insulating housing in a back end of the insulating housing, a bottom edge of the plastic plate presses and contacts with a top edge of the soldering portions of the conductive terminals.

Other objects, advantages, and novel features of the present invention will became more apparent from the following detailed description when taken in conjunction with the accompanying drawings.

DETAILED DESCRIPTION OF PREFERRED EMBODIMENTS

Figure 1:
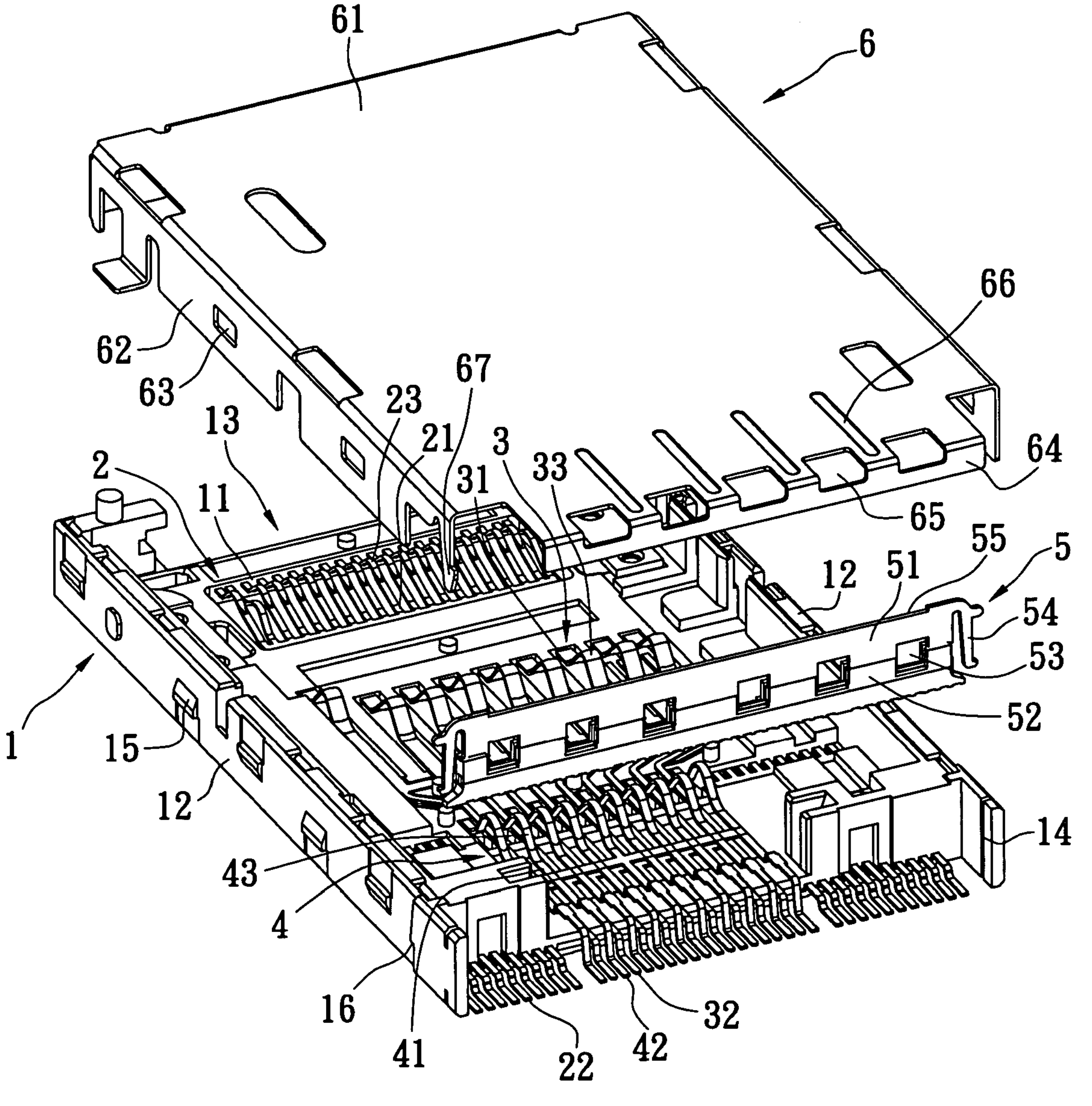
FIG. 1 is a perspective view of a card reading device according to the present invention.
Figure 2:
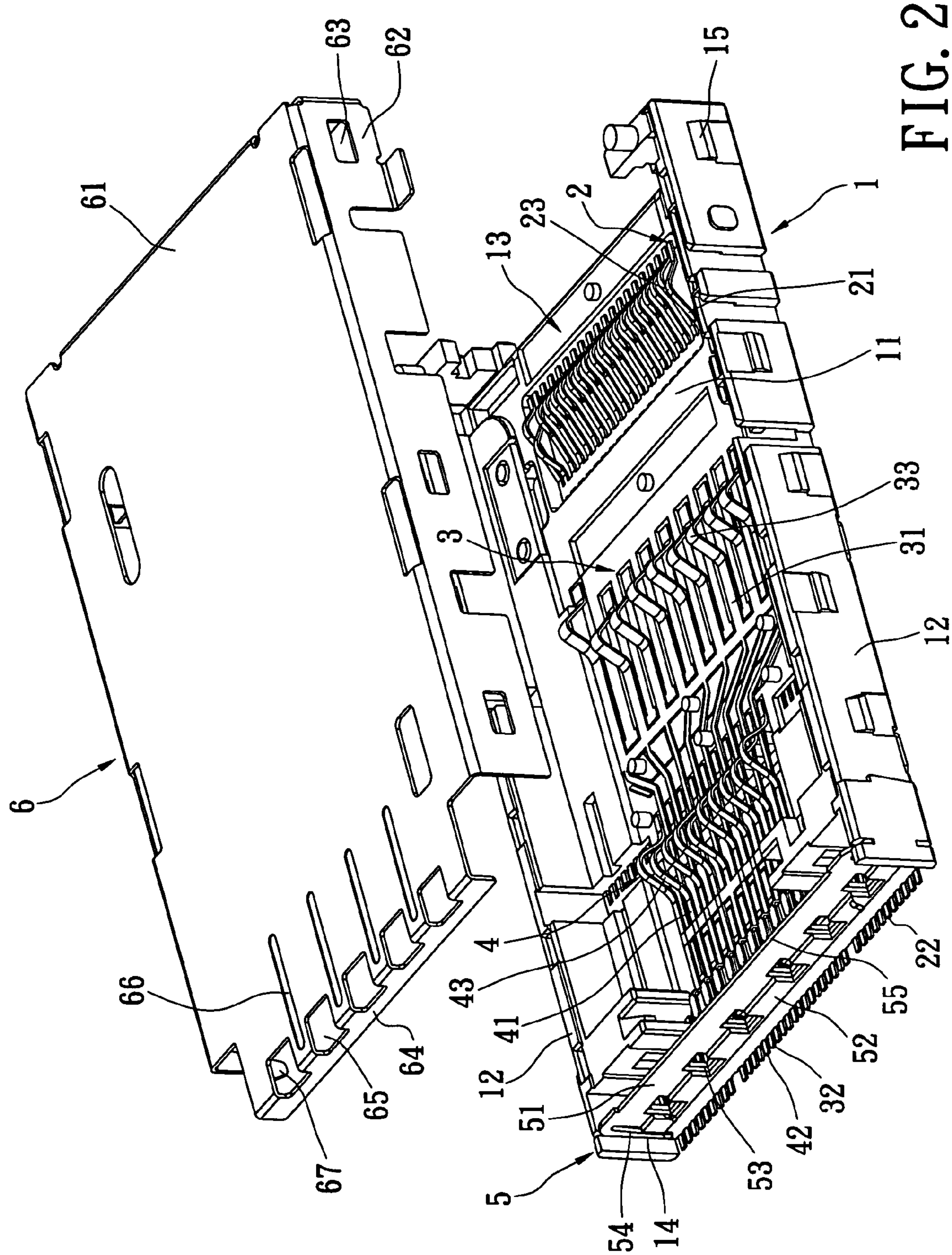
FIG. 2 is a perspective view of the card reading device of FIG. 1, shown in another viewing angle.
Figure 3:
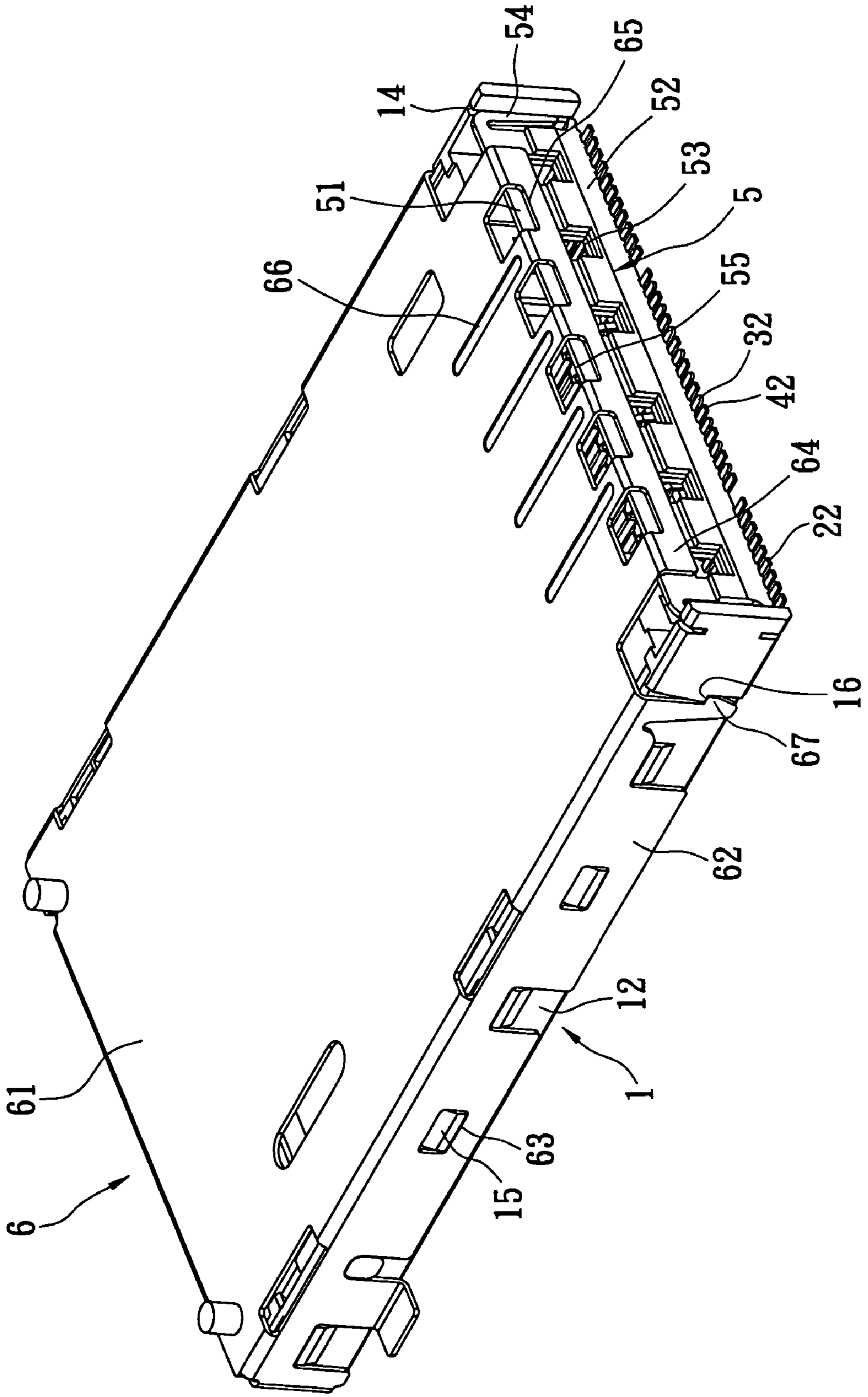
FIG. 3 is an assembled view of FIG. 1 according to the present invention.

Referring to FIGS. 1-3, a card reading device in accordance with the present invention is shown. The card reading device comprises an insulating housing 1, a first set of conductive terminals 2, a second set of conductive terminals 3, a third set of conductive terminals 4, a rear wall 5, and a shielding member. The insulating housing 1 is made of plastic material, which includes a base portion 11, and two arms 12 parallel extending form two ends of the base portion 11 respectively so as to form a receiving cavity 13 for inserting electrical card. Moreover, each of the arms 12 includes an engaging groove 14 disposed at an inner side of the arms 12 adjacent to a rear portion thereof, the engaging grooves 14 are extending from a top portion to a bottom portion of the arms 12 respectively.

The first, the second, and the third set of conductive terminals 2, 3 and 4 includes a plurality of conductive terminals 21, 31, and 41, respectively. The conductive terminals 21, 31, and 41 are made of elastic conductive metal material, which are alternately mounted on the base portion 11 of the insulating housing 1 and arranged according to a direction for inserting or ejecting electrical cards.

Each of the conductive terminals 21, 31 and 41 has a soldering portion 22, 32 and 42 extending out of a rear end of the insulating housing 1 respectively, which is made by bending each of one rear end of the conductive terminals 21, 31 and 41 for soldering and electrical connecting with a PCB. Each of the conductive terminals 21, 31 and 41 has a contact portion 23, 33 and 43 extending into a front portion, a middle portion, and a rear portion of the receiving cavity 13 respectively, which is made by bending each of one front end of the conductive terminals 21, 31 and 41 for electrical connecting with the electrical card inserted therein.

The rear wall 5 includes a metal plate 51 and a plastic plate 52, the metal plate 51 and the plastic plate 52 are integrated in a up and down manner by insert-molding. The rear wall 5 includes a plurality of openings 53 alternately disposed. Shape and size of the openings 53 are not limited, which can vary according to practically desired. The rear wall 5 includes mating portions 54, which are downwardly extending from two sides of the metal plates 51. Each of the mating portions 54 has an elastic free end. The rear wall 5 has a pressed portion 55 disposed on a top edge thereof, which is formed by fabricating a concave thereon. The mating portions 54 are retained in the corresponding engaging grooves 14 of the arms 12 of the insulating housing 1 respectively so as to engage the rear wall 5 to a end portion of the insulating housing 1, and make a bottom portion of the plastic plate 52 of the rear wall 5 reliably press and contact with the top edges of the soldering portions 22, 32 and 42 of the conductive terminals 21, 31 and 41.

The shielding member 6 is made of metal material, which is mounted on the insulating housing 1, and is good to prevent EMI (Electro-Magnetic Interference). The shielding member 6 has a top plate 61, and two side plates 62 downwardly extending from two sides of the top plate 61 respectively. The two side plates 62 include a plurality of latching holes 63 respectively. The insulating housing 1 further comprises a plurality of latching tabs 15 disposed at outer side of the arms 12 corresponding to the latching holes 63. The latching tabs 15 mate with the latching holes 63 so as to assembly the shielding member 6 and the insulating housing 1. The shielding member 6 further comprises at least a latching part 67 disposed at one side of the shielding member 6. The insulating housing 1 further comprises a fastener 16 corresponding to the latching part 67. When assembled, the latching part 67 is fixed to the fastener 16 for securely assembly the shielding member 6 and the insulating housing 1.

The top plate 61 of the shielding member 6 presses the pressed portion 55 of the rear wall 5 for making the rear wall 5 reliably press and contact with the top edges of the soldering portions 22, 32 and 42 of the conductive terminals 21, 31 and 41. The shielding member 6 has an abutting pad 64 downwardly extending form a rear end of the top plate 61 for abutting against a rear side of the rear wall 5 in order to make the rear wall 5 stable. The shielding member 6 further comprises a plurality of openings 65 disposed at a rear end of the top plate 61, and shape and size of the openings 65 are not limited. The shielding member 6 includes a plurality of assistant rib 66 disposed at the top plate 61 adjacent to the openings 65 for improve the intensity.

While operating, the electrical card (not shown) is inserted into the receiving cavity 13 along the inserting direction, then contact terminals of the electrical card are electrical connected to the contact portions 23, 33 and 43 of the conductive terminals 21, 31 and 41. It make the electrical card electrical connect to the PCB. It is convenient to eject the electrical card by operate on an ejector (not shown).

According to the foregoing description, comparing with the conventional card reading device, the card reading device according to the present invention has following advantages.

First, the rear wall 5 is formed by insert molding, which comprises a metal plate 51 having a good intensity and unlikely to shake or distortion for ensuring the rear wall 5 reliably press and contact with the top edge of the soldering portions 22, 32 and 42 of the conductive terminals 21, 31 and 41 and avoid soldering skipping or solder voiding.

Second, a shielding member 6 is mounted on the insulating housing 1 and press the top edge of the rear wall 5 for making the rear wall 5 reliably pressing and contact with the top edge of the soldering portions 22, 32 and 42 of the conductive terminals 21, 31 and 41.

Third, the rear wall 5 and the shielding member 6 both includes a plurality of openings 53, 65 respectively and make the card reading device has a open configuration. Thereby, during the soldering process in a solder pot, gas in the card reading device can circular for avoiding soldering skipping or solder voiding and ensuring reliably soldering, which make the card reading device having an excellent electric property.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A card reading device comprising:

an insulating housing having a receiving cavity;

at least a set of conductive terminals having a plurality of conductive terminals mounted on the insulating housing, each of the conductive terminals having a soldering portion extending out of the insulating housing, and a contact portion extending into the receiving cavity; and a rear wall having a metal plate and a plastic plate integrated with the metal plate to extend in substantially coplanar manner therefrom, the rear wall connecting with the insulating housing in a back end of the insulating housing, a bottom edge of the plastic plate pressing and contacting with a top of the soldering portions of the conductive terminals.

2. The card reading device as claimed in claim 1 wherein the insulating housing further comprises a base portion, and two arms parallel extending from two ends of the base portion respectively so as to form the receiving cavity.

3. The card reading device as claimed in claim 2, wherein each of the arms comprises an engaging groove disposed at an inner side of the arms adjacent to a rear portion thereof, the rear wall comprising mating portions that extending from two sides of the metal plate and inserting into the engaging grooves.

4. The card reading device as claimed in claim 1, wherein the metal plate and the plastic plate are integrated by insert molding.

5. The card reading device as claimed in claim 1, wherein the rear wall comprises openings therein.

6. The card reading device as claimed in claim 1, further comprising a shielding member having a top plate and two side plates, the shielding member engaging with the insulating housing, the top plate pressing a top edge of the rear wall.

7. The card reading device as claimed in claim 6, wherein the top edge of the rear wall comprises a pressed portion, the pressed portion defining a concave contour along the top edge of the rear wall, the top plate engaging the pressed portion of the top edge of the rear wall.

8. The card reading device as claimed in claim 6, wherein the top plate further comprises an abutting plate extending from a rear end thereof, the top plate abutting a rear side of the rear wall.

9. The card reading device as claimed in claim 6, wherein the shielding member further comprises openings disposed at rear end thereof.

10. The card reading device as claimed in claim 9, wherein the shielding member further comprises assistant ribs disposed adjacent to the openings thereof.

11. The card reading device as claimed in claim 6, wherein each of the side plates comprises a plurality of latching holes, the insulating housing further comprising a plurality of latching tab corresponding to the latching holes, the latching tabs mating with the latching tabs so as to assembly the shielding member and the insulating housing.

12. The card reading device as claimed in claim 6, wherein the shielding member comprises at least a latching part, and the insulating housing comprising at least a corresponding fastener, the latching part fixing to the fastener.

13. A card reading device comprising:

an insulating housing having a receiving cavity extending between a pair of side wall portions;

at least a set of conductive terminals having a plurality of conductive terminals mounted on the insulating housing, each of the conductive terminals having a soldering portion extending out of the insulating housing, and a contact portion extending into the receiving cavity; and a rear wall having a metal plate and a plastic plate integrated with the metal plate along a peripheral edge to extend in substantially coplanar manner therefrom, the rear wall detachably fastened to the side wall portions of the insulating housing to extend transversely therebetween at a back end of the insulating housing, a bottom edge of the plastic plate pressing and contacting with a top of the soldering portions of the conductive terminals.

* * * * *